United States Patent [19]
Gillum

[11] 3,723,779
[45] Mar. 27, 1973

[54] COMPENSATED LINEAR MOTOR
[75] Inventor: Donald E. Gillum, Goleta, Calif.
[73] Assignee: Information Magnetics Corporation, Goleta, Calif.
[22] Filed: June 22, 1970
[21] Appl. No.: 47,977

[52] U.S. Cl..................................310/13, 310/27
[51] Int. Cl..............................................H02k 41/02
[58] Field of Search..................310/12–14; 179/115–119

[56] References Cited

UNITED STATES PATENTS

| | | | |
|---|---|---|---|
| 2,781,461 | 2/1957 | Booth et al. | 310/27 |
| 3,106,653 | 10/1963 | Fowler | 310/29 |
| 3,163,786 | 12/1964 | Dickinson | 310/27 |
| 3,505,544 | 4/1970 | Helms | 310/13 |

FOREIGN PATENTS OR APPLICATIONS 795,000   5/1958   Great Britain..........................310/27

*Primary Examiner*—D. F. Duggan
*Attorney*—Harry W. Brelsford

[57] ABSTRACT

A linear motor having a tubular shell and a center core of magnetic material, has a tubular working air gap formed between a magnet and the core or between the shell and the magnet. A tubular armature is disposed within the tubular air space. Compensation windings are provided that do not occupy the working air gap. Instead, these windings are placed in grooves in one surface of the working air gap and thereby do not increase the air gap dimension, nor decrease the flux density, resulting in an air gap of maximum flux density. With presently available magnets the grooves are preferably formed in the magnetic material of the shell or core. The compensation windings may be shorted, connected with the armature, as in parallel, or any combination.

5 Claims, 4 Drawing Figures

PATENTED MAR 27 1973

INVENTOR.
DONALD E. GILLUM
BY H. W. Brelsford
ATTORNEY.

INVENTOR.
DONALD E. GILLUM
BY H.W. Brelsford
ATTORNEY

COMPENSATED LINEAR MOTOR

My invention relates to linear electric motors that produce reciprocating motion and has particular reference to compensated electric motors.

While there are numerous uses for linear electric motors, the present invention will be described with reference to linear motors for use in moving read-write heads for reading and imprinting magnetic signals on the magnetizable surfaces of rotatable disks. Such disks are commonly used for the retention and recovery of data for computers. The requirements for such motors give rise to important dynamic electrical characteristics as well as static or steady state conditions. The present invention provides a linear motor that responds effectively to such dynamic and static requirements.

In present data storage practice, the magnetizable disks rotate extremely rapidly and have about 200 separate, concentric tracks upon which the magnetic imprints are made. The "heads," which are electromagnetic transducers, imprint these tracks when "writing" and sense these imprints when "reading." The heads require only a few milliseconds to read or write a track and then are moved extremely rapidly to another track for reading or writing. The time of movement is also a few milliseconds. A head that is in active use, therefore, must be moved at a rate that can approach 500 cycles per second. During the dwell time on a track, the head must be held with great accuracy and rigidity over that particular track. The motors of the invention meet these stringent dynamic and static performance requirements.

Present data storage practice employs a stack or "pack" of up to 11 disks rotating on a single spindle and since both sides are utilized, this gives a possible 22 surfaces that can be utilized simultaneously. In actual practice, 20 surfaces are utilized. This requires one linear motor to actuate all 20 read-write heads of typical disk drives. The sheer bulk of such motors in a cabinet imposes space demands for minimum volume for each motor. Further, such motors with eight or more disk drives in a data storage facility give rise to severe electric current demands. The present motor invention results in maximum output per unit of volume of the motors and, furthermore, results in extremely high efficiency of current utilization.

It is therefore a general object of the invention to provide improved linear motors.

Other objects, advantages and features of the invention will be apparent in the following description and claims, considered together with the accompanying drawings forming an integral part of this specification in which:

Figure 1:
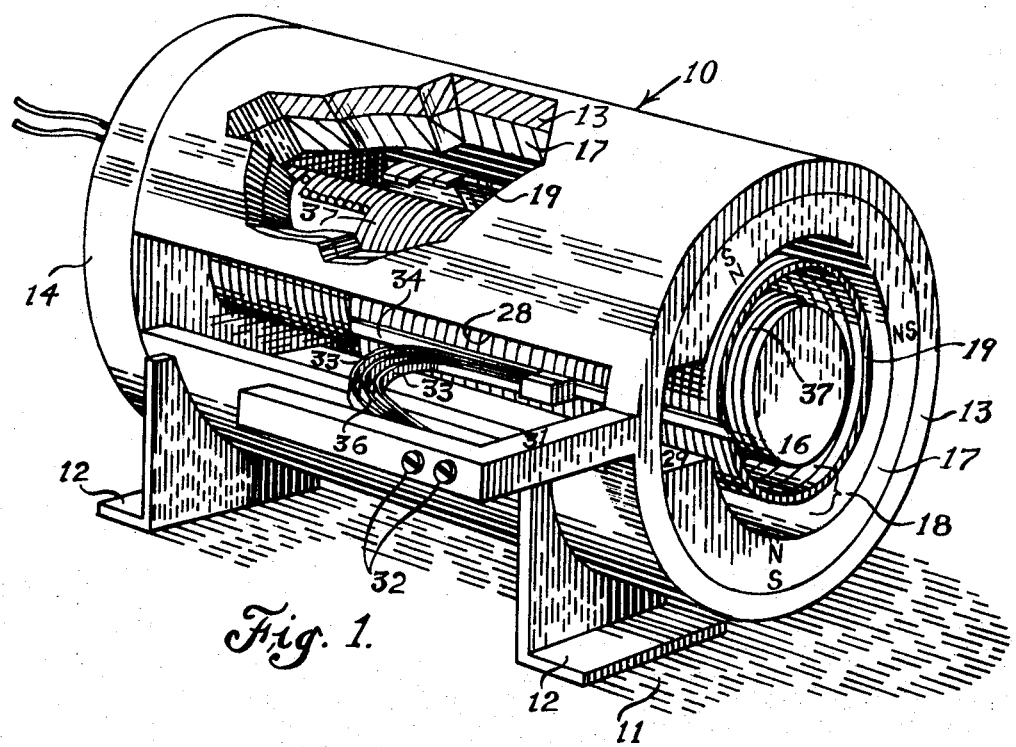
FIG. 1 is a three-dimensional view of a cylindrical motor embodying the invention, with a portion of it broken away to show the interior construction.

Referring to FIG. 1, there is illustrated a motor 10 resting on a surface 11. Brackets 12 support a cylindrical shell 13 which is open at its right end, but closed at its left end by a plate 14. Supported in cantilever fashion from the end plate 14 is a center core 16 which is spaced from and concentric with the outer shell 13. The shell 13, the end plate 14 and the center core 16 are all formed of magnetic material; that is, materials of high magnetic permeability and low magnetic reluctance, such as soft iron and low-carbon steel.

Disposed on the interior of the outer shell 13 is a tubular magnet 17 which is radially polarized uniformly over its entire cross-section and length. Accordingly, the notations on the right end of FIG. 1 of "N" and "S" illustrate that one pole is toward the interior surface of the tubular magnet 17 and the other pole is on the exterior surface. Lines of flux from this magnet travel into the outer shell 13, thence to the left to end plate 14 and into the center core 16 to become fairly uniformly distributed over the entire inner surface of the magnet 17. The inner surface of the magnet 17 is spaced from the center core 16 to define an air gap 18 which is the working air gap of the motor. A cylindrical coil 19 is disposed in this air gap 18 and cuts the lines of flux between the center core 16 and the interior surface of the magnet 17.

Figure 2:
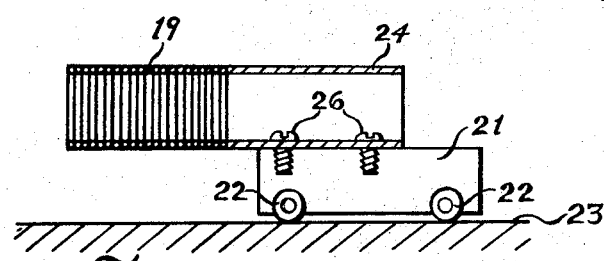
FIG. 2 is a schematic view in elevation with parts in full section, showing a carriage for supporting the armature coil of FIG. 1 in cantilever fashion.

Illustrated in FIG. 2 is a presently preferred method of supporting the armature coil 19 and this includes a carriage 21 having wheels 22 which support it on accurately machined rails 23. Fastened to the top of the carriage 21 is a tubular member 24 formed of a non-conductor material, such as plastic, and this may be secured in any suitable fashion to the carriage 21, such as by fasteners 26. The left end of the tube 24 of FIG. 2 may be adhered to the armature coil 19 in any suitable fashion, as by the use of epoxy cement. The carriage 21 accurately positions the armature coil 19 within its air gap, so that extremely close tolerances may be maintained in spacing between the adjacent surfaces defining the air gap 18.

Referring back to FIG. 1, current may be supplied to the armature coil 19 in any suitable fashion, and I presently prefer to introduce this from the side of the coil, although it could be supplied through the carriage 21. It will be noted that the exterior shell 13 of magnetic material is slotted lengthwise at 28 and the tubular magnet 17 has a similar slot 29 in registry with the shell slot 28. Extending from the shell 13 is an L-shaped member 31 which supports a pair of electrical terminals 32 to which are connected a pair of flexible strip conductors 33, the other end of which is connected to a lengthwise strip 34 on the armature coil 19. The strip 34 carries current from one conductor 33 to one end of the coil 19 and receives current from the other end of the coil 19. If desired, a center insulator strip 36 may be disposed between the two conductors 33.

Provided on the exterior of the center core 16 is a compensation winding 37. This compensation winding creates a magnetic flux which is opposite to and approximately equal to the magnetic flux induced by the current through the armature coil 19. Various circuits may be employed for creating a current in this compensation coil 37.

The essential requirement is that the part of the compensation coil, or all of it, as the case may be, that is generating a counter flux to that of the armature coil, have an effective number of ampere turns approximately equal to that of the ampere turns of the armature coil. The compensation coil corrects for the distortion of the lines of flux from the magnet 17 to the center core 16. When armature coil 19 is energized, it creates a magnetic field of its own, which is at right angles to the generally radial lines of flux from the center core 16 to the magnet 17. This tends to push these lines of flux to one end or the other of the axial length of the magnet 17, depending upon the direction of current in the coil 19. The coil 19, accordingly, cuts fewer lines of flux and has less force than would otherwise be the case. The compensation winding 37 produces a counter flux to that generated by the armature coil, and this restores the flux density pattern to approximately that which exists in the absence of energizing the armature coil. The force, therefore, produced by the armature coil does not fall off at high current densities for the armature coil, which is a common characteristic of linear motors in the absence of compensation.

Figure 3:
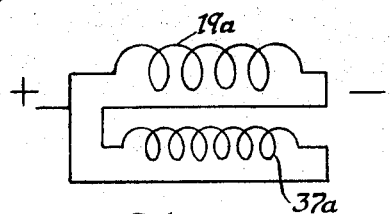
FIG. 3 is a circuit diagram showing the compensation winding connected in parallel with the armature coil.

Illustrated in FIG. 3 is a circuit wherein an armature coil 19a is connected in parallel with a compensation coil 37a. The connections are such that the current flows through the coils are opposite, creating equal and opposite fluxes indicated the appropriate arrows. In this case, the compensation coil 37a must be wound the full length of the by the of the armature coil and parts of the compensation coil are energized which are not fully effective because the compensation coil has a greater axial length than the axial length of the armature coil 19a.

Figure 4:
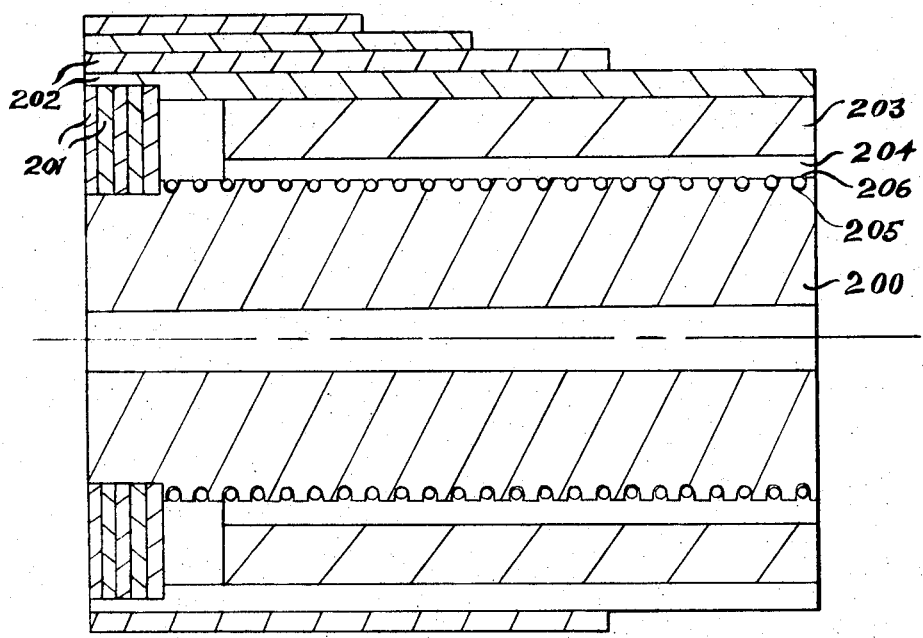
FIG. 4 is a sectional elevation view of a modified form of the motor of FIG. 1, and wherein the compensation windings are disposed in grooves in the center core.

Illustrated in FIG. 4 is a modified form of the motor of FIG. 1 wherein a center core 200 is secured by washers 201 to an outer shell 202. Within the shell 202 is closely fitted a tubular magnet 203 having radial polarization. A working air gap 204 is formed between the interior of the magnet and the center core 200.

I have discovered that grooves can be cut in the exterior of the core without increasing the magnetic dimension in a radial direction. That is, the grooved center core gives as strong a flux in the working air gap as a smooth one. I have discovered that compensation coils can be placed in these grooves without occupying any part of the air gap.

Accordingly, a helical groove 205 is formed in the exterior surface or periphery and a compensation winding is disposed therein that gives as good compensation as though on the surface as in FIG. 1. An armature coil (not shown) can be placed in the air gap 204 as in FIG. 2.

These grooves could be ring-shaped for short circuited turns, or any combination.

Operation of FIGS. 1 and 2

The output of the motors of FIGS. 1 and 2 is transmitted by the movable armature coil 19 to the plastic tube 24 which, in turn, moves the carriage 21 to which the devices are connected that are desired to be moved. The output of the motors, accordingly, is a rectilinear. The tubular permanent magnet 17 creates a steady flux between its interior surface and the center core 16 of magnetic material. Referring to FIG. 1, current is passed from the terminals 32 through the strips 33 to each end of the armature coil 19 to cause it to move in one direction or the other, depending upon the direction of current flow. The carriage 21 of FIG. 2 supports the coil 19 in its very close spaced relationship to the interior of the magnet. The reaction between the armature and flux extending from the core to the magnet causes the flux to be moved to one end of the armature coil or the other, depending on the direction of current flow. The function of the compensation winding 37 is to reduce this distortion so that the armature coil is operating against a steady flux density throughout its length. Changes of current in the armature coil induce currents to flow in the shorted turns of compensation coil 37 and it, in turn, sets up a magnetic flux 63 which is opposite and approximately equal to the magnetic flux 62 of the armature coil. The distortion of the radial lines of flux between the center core 16 and the tubular magnet 17 is, accordingly, eliminated without any decrease in the axial force generated by current in the armature coil 19.

COMPENSATION

Compensation of linear motors involves the correction of at least two different phenomena. One phenomenon is the pushing of the lines of flux in the working air gaps to one end of the magnet or the other because of the local magnetic field around each conductor of the armature coil. Another phenomenon is the over-all weakening or strengthening of the magnetic field in the working air gap because of the general flux field created by the armature coil.

The crowding of the air gap lines of flux to one axial end or the other of the working air gap weakens the over-all force developed by the armature because it cuts fewer lines of flux than those normally present. This phenomenon is corrected by a compensation winding distributed over the length of the magnet face or the length of travel of the armature over a core member. Ideally, there should be two compensation windings for perfect compensation, one just inside the armature coil and one just outside the armature coil. Practically, however, one compensation winding gives excellent correction and restores the uniformity of flux over the working air gap.

The over-all strengthening or weakening of the air gap flux due to the armature current is caused by the armature field acting through the magnetic frame of the motor. In one direction it aids the magnetic field and in the other it weakens it and may even demagnetize the permanent magnet.

It will be appreciated by those skilled in the art that the tubular magnet of FIG. 1 could be in contact with the center core 16 and the working air gap formed between the magnet and the outer shell with compensation on either surface of the air gap, or concentrated at one end or the other.

Various types of permanent magnets can be used, depending upon design requirements as to coercive force, gauss density, etc. At present I prefer ceramic magnets, but metal magnets can be used. All such variations and modifications that fall within the true spirit and scope of the invention are included in the following claims.

I claim:

1. A compensated linear electric motor comprising:
   a. a tubular shell of magnetic material having a tubular axis;
   b. a center core of magnetic material magnetically connected to the shell by at least one low reluctance magnetic path, and spaced from the shell;

c. a radially polarized tubular permanent magnet disposed within the tubular shell for magnetic contact with the surface of one of said shell or center core and spaced from the surface of other to form a working air gap;

d. a compensation winding disposed at one air gap surface;

e. an armature winding disposed in said air gap;

f. and means for supporting the armature for axial movement within the motor;

g. and conductors connecting the compensation winding and armature winding in parallel.

2. A compensated linear electric motor comprising:

a. a tubular shell of magnetic material having a tubular axis;

b. a center core of magnetic material magnetically connected to the shell by at least one low reluctance magnetic path, and spaced from the shell;

c. a radially polarized tubular permanent magnet disposed within the tubular shell for magnetic contact with the surface of one of said shell or center core and spaced from the surface of other to form a working air gap wherein at least one surface of said air gap is grooved;

d. a compensation winding disposed in the grooves of said one air gap surface;

e. an armature winding disposed in said air gap;

f. and means for supporting the armature for axial movement within the motor.

3. A linear motor as defined in claim 2 wherein the center core is peripherally grooved and the compensation winding is placed in said grooves, to thereby obtain distributed air gap compensation without the compensation winding occupying the air gap.

4. A linear motor as set forth in claim 2 wherein the center core is an air gap surface and has a helical groove therein and the compensation winding is helical and located in said groove, to obtain air gap surface compensation without the compensation occupying any appreciable part of the air gap.

5. A compensated linear motor having an axis of reciprocation comprising:

a. a core of magnetic material;

b. a magnet having a polarization transverse to the axis and separated by a space from said core to define a working air gap;

c. an armature coil having at least a portion disposed in said working air gap;

d. a compensation winding magnetically coupled to said core;

e. and conductors connecting said armature coil and compensation coil in parallel.

* * * * *